(No Model.)

W. P. GROOM.
BUSINESS BLANK.

No. 336,007. Patented Feb. 9, 1886.

ATTEST.
J. Henry Kaiser.
Harry L. Amer.

INVENTOR.
Wallace P. Groom,
by R. S. Dewenforth
his attorney-

United States Patent Office.

WALLACE P. GROOM, OF BROOKLYN, NEW YORK.

BUSINESS-BLANK.

SPECIFICATION forming part of Letters Patent No. 336,007, dated February 9, 1886.

Application filed November 3, 1885. Serial No. 181,795. (No model.)

*To all whom it may concern:*

Be it known that I, WALLACE P. GROOM, a citizen of the United States, residing at 249 Kosciusko street, Brooklyn, in the county of Kings and State of New York, have invented certain new and useful Improvements in Business-Blanks, &c.; and I do hereby declare the following to be a full, clear, and exact description of the invention, such as will enable others skilled in the art to which it appertains to make and use the same.

The object of my invention is to provide a blank for the use of transfer and exchange or trust associations and companies or the like who have the custody of property for its safekeeping and intertransfer or interchange, and for persons, firms, or corporations transacting business through or by said associations or companies for the intertransfer or interchange of such property, whereby safety to both parties to such transaction will be insured.

The invention is embodied in a blank comprising three parts, each having thereon such information and marks as to what the property is and as to how and within what time it shall be intertransferred as will be necessary for the guidance of and direction to the transfer association or company, and such as will serve for information and security to parties in the transaction.

In the accompanying drawing, illustrating a blank embodying my invention, the letter A designates the stub, B the "record" portion, and C the "voucher" or duplicate portion. The portion A will contain places for the insertion of such data as may be necessary or useful to the book-keeper or accountant of the issuer of the instrument—such, for example, as the name of the opposite party to a transaction, the name of stock or other property transferred in or out, as the case may be, and adjacent thereto are two columns, the one headed "coming in," and immediately beneath that "dollars and cents" or other designation, and the other "going out," and immediately beneath that the word "shares" or other designation, according to the facts of the case. A space may also be provided for other memoranda. The portion B is the authorization or instruction to an association acting as custodian that certain property is to be intertransferred or interchanged, and this is to contain the name of such association or company—for example, the "United States Transfer and Exchange Association"—and words directing that upon the "prompt" transfer by or on the authorization of transfer made by a second party of a certain amount of money or property the one or the other is to be transferred to said second party's credit. The part C is the voucher half of this order. It is intended to be stamped or otherwise marked by the trustee or custodian of the property, so as to correspond to a mark placed upon the order when the latter is placed with the custodian. This part C is retained by the buyer as a voucher of the order and to show that the same has been placed with the trustee.

The three parts A, B, and C are preferably divided by two lines of perforations, a, and each of these parts is provided near its edge with signs—for example, as shown, the representation of the sun to indicate day or time—and beneath or near each certain hour-designations, as eleven a. m., twelve m., one p. m., two p. m., and three p. m., or such other periods as may be included in the time in which business is transacted. These signs, with their hour-designations, are preferably arranged upon the edges which will come together when the paper is folded, so that they may be punched simultaneously; and when they are punched they will indicate the time within which the property must be passed to the credit of the respective parties. Near the lower edge of each blank I arrange a series of figures, 1 2 3 4 5, &c., so that when the paper is folded the corresponding numbers will be punched simultaneously. These numbers are used to indicate that the time within which the exchange is to take place may be advanced—for example, it is indicated by punched holes b on the body of the order that the transaction must be completed by one p. m. on the day of maturity, and by mutual consent or agreement the time has been advanced three (3) days from the date of the instrument, and it is so indicated by punching holes at the figure 3 on each of the parts. It is desirable that there should be one set of these parts A, B, and C for each party to the transaction, and each set may be of different color—for example, red, black, green, or blue. When the property to be interchanged consists of stocks and money, the one will be printed to indicate stocks where the other indicates money as the consideration, and vice versa. Upon the backs of the parts B and C an explanation of the use and scope of the blanks may be printed. In this case something like the following partial explanation may suffice: The word "prompt" as used on the within order shall be understood to mean on the day of its date, and at three o'clock of that day, unless some earlier hour is indicated by the use of a punch at the figures to indicate time. When a line or other marking, as at the lower end of the order, is punched, the time shall be set forward as many days from the date as the figures at such line or mark indicate. When more than one indication, either as to the hour or date, is thus made, the latest hour and the latest date shall control.

Having thus described my invention, what I claim, and desire to secure by Letters Patent, is—

1. The herein-described blank for use by transfer and exchange or trust associations and the like, and for persons, firms, or corporations transacting business through or by them, consisting of the three parts A, B, and C, the part A being the stub and to contain data for the future information of the maker of the instrument, the part B to contain the order or authorization for the company or association acting as custodian to make the intertransfer or interchange, and the part C to be a duplicate of said order or authorization, for evidence to the appropriate party that the order for interchange or transfer has been entered by the custodian of the property, each of the said parts A, B, and C containing marks or signs with hour-designation marks to be punched to indicate within what time of day the transaction is to be completed, as set forth.

2. The herein described blank for use by transfer and exchange or trust associations and the like, and for persons, firms, or corporations transacting business through or by them, consisting of the three parts A, B, and C, the part A being the stub and to contain data for the future information of the maker of the instrument, the part B to contain the order or authorization for the company or association acting as custodian to make the intertransfer or interchange, and the part C to be a duplicate of said order or authorization, for evidence, when stamped, to the appropriate party that the order for interchange or transfer has been entered by the custodian of the property, each of the said parts A, B, and C containing marks or signs with hour-designation marks to be punched to indicate within what time of day the transaction is to be completed, and also figures to indicate how many days the time is or may be advanced or set forward from the date of the instrument.

3. The herein-described blank for use by transfer and exchange or trust associations and the like, and for persons, firms, or corporations transacting business through or by them, consisting of the three parts A, B, and C, the part A being the stub and to contain data for the future information of the maker of the instrument, the part B to contain the order or authorization for the person, company, or association acting as custodian to make the intertransfer or interchange, and the part C to be a duplicate or voucher of said order or authorization, for evidence, when stamped or otherwise marked, to the appropriate party that the order for interchange or transfer has been entered by the custodian of the property.

In testimony whereof I affix my signature in presence of two witnesses.

WALLACE P. GROOM.

Witnesses:
CHARLES H. LUSCOMB,
GEO. KUMPER.